United States Patent
Tang et al.

(10) Patent No.: US 10,693,292 B2
(45) Date of Patent: Jun. 23, 2020

(54) SURGE PROTECTION CIRCUIT WITH FEEDBACK CONTROL

(71) Applicant: NXP B.V., Eindhoven (NL)

(72) Inventors: Shenglan Tang, Shanghai (CN); Jian Qing, Shanghai (CN); Xindong Duan, Shanghai (CN)

(73) Assignee: NXP USA, Inc., Eindhoven (NL)

( * ) Notice: Subject to any disclaimer, the term of this patent is extended or adjusted under 35 U.S.C. 154(b) by 322 days.

(21) Appl. No.: 15/678,991

(22) Filed: Aug. 16, 2017

(65) Prior Publication Data

US 2018/0138696 A1 May 17, 2018

(30) Foreign Application Priority Data

Nov. 15, 2016 (CN) .......................... 2016 1 1009766

(51) Int. Cl.
*H02H 9/00* (2006.01)
*H02H 9/04* (2006.01)

(52) U.S. Cl.
CPC .................... *H02H 9/041* (2013.01)

(58) Field of Classification Search
None
See application file for complete search history.

(56) References Cited

U.S. PATENT DOCUMENTS

| | | | |
|---|---|---|---|
| 5,311,391 A | 5/1994 | Dungan et al. | |
| 5,946,177 A | 8/1999 | Miller et al. | |
| 6,630,858 B1 * | 10/2003 | Takabayashi | G05F 1/575 |
| | | | 327/538 |
| 6,671,153 B1 * | 12/2003 | Ker | H01L 27/0255 |
| | | | 361/111 |
| 6,999,292 B2 | 2/2006 | Clara et al. | |
| 7,072,157 B2 * | 7/2006 | Kitagawa | H01L 27/0251 |
| | | | 361/111 |
| 7,203,045 B2 * | 4/2007 | Chatty | H01L 27/0266 |
| | | | 361/111 |
| 7,586,716 B2 | 7/2009 | Yamazaki | |
| 10,014,682 B2 * | 7/2018 | Wang | H02H 9/04 |
| 10,096,994 B2 * | 10/2018 | Wang | H02H 9/046 |

(Continued)

FOREIGN PATENT DOCUMENTS

| | | |
|---|---|---|
| CN | 104242285 | 12/2014 |
| CN | 104332981 | 2/2015 |
| EP | 2355152 | 8/2011 |

OTHER PUBLICATIONS

William D. Mack and Robert G. Meyer, "New ESD Protection Schemes for BiCMOS Processes with Application to Cellular Radio Designs", ISCAS Proceedings, IEEE International Symposium, vol. 6, 1992. pp. 2699-2702.

(Continued)

*Primary Examiner* — Stephen W Jackson

(57) ABSTRACT

A surge protection circuit includes a DC trigger circuit that generates a trigger signal when a surge pulse occurs, and a surge protection device, coupled to the DC trigger circuit, that generates a clamp voltage as an output voltage of the surge protection circuit and conducts surge currents to ground in response to the trigger signal. A feedback circuit is provided between the surge protection device and the DC trigger circuit. The feedback circuit lowers the clamp voltage so that it does not exceed a failure voltage of the surge protection device.

20 Claims, 4 Drawing Sheets

(56) References Cited

U.S. PATENT DOCUMENTS

| | | |
|---|---|---|
| 10,218,171 B2 | 2/2019 | Zhu et al. |
| 2010/0254051 A1 | 10/2010 | Jeon et al. |
| 2012/0161216 A1 | 6/2012 | Liang et al. |
| 2013/0100561 A1 | 4/2013 | Senouci et al. |
| 2013/0128400 A1 | 5/2013 | Yeh |
| 2014/0254051 A1 | 9/2014 | Srivastava et al. |
| 2016/0071836 A1 | 3/2016 | Tsai |
| 2016/0087429 A1* | 3/2016 | Wang .................. H02H 9/046 361/56 |

OTHER PUBLICATIONS

Vladislav Vashchenko, Blerina Aliaj, Augusto Tazzoli, and Andrei Shibkov, "Active Clamps with Hybrid BJT-CMOS Operation Modes", Electrical Overstress/Electrostatic Discharge (EOS/ESD) Symposium, 2015. pp. 1-7.

Julien Lebon, Guillaume Jenicot, Peter Moens, Dionyz Pogany, and Sergey Bychikin, "IEC and HBM: How to Optimize On-Chip Protections to Handle Both Requirements," EOS/ESD Symposium 09-358, 2009.

Non Final Office Action; U.S. Appl. No. 15/344,552; 13 pages (dated Sep. 20, 2018).

Notice of Allowance; U.S. Appl. No. 15/344,552; 8 pages (dated Jan. 14, 2019).

\* cited by examiner

SURGE PROTECTION CIRCUIT WITH FEEDBACK CONTROL

BACKGROUND

The present invention is directed to a protection circuit and, more particularly, to an on-chip surge protection circuit.

Current and voltage spikes (i.e., energy spikes) can damage electronic circuits. Energy spikes are fast, short duration electrical transients in voltage (voltage spikes), current (current spikes), or transferred energy (energy spikes) in an electrical circuit. Such spikes can be caused by, for example, electro-static discharge (ESD) events. An uninterrupted voltage increase that typically lasts for about 50 uSec is called a "voltage surge" rather than a spike. Since voltage spikes and surges can damage sensitive electronics, many circuits include ESD and surge protection circuitry.

FIG. 1 is a schematic circuit diagram of a conventional ESD protection circuit 10, which includes an AC trigger circuit 12 and an ESD protection device 14. The AC trigger circuit 12 includes first and second resistors R1 and R2, a capacitor C1, and a P-type transistor MP1, while the ESD protection device 14 comprises a large N-type transistor MN1. When an ESD pulse occurs, the current charges the capacitor C1, which turns on the transistor MP1. The transistor MP1 and the resistor R2 in turn bias the transistor MN1, and then the transistor MN1 conducts the ESD generated current to ground.

However, the ESD protection device 14 is only active for a very short time (several hundreds of nanoseconds or less), which may be much less than the period of a surge event, which typically has a pulse duration of around 50 μs or longer. Thus, the conventional ESD protection circuit 10 does not adequately handle surge events.

Accordingly, it would be beneficial to have an ESD protection circuit that also can protect against surge events.

SUMMARY

The present invention provides a surge protection circuit. The surge protection circuit comprises a DC trigger circuit that generates a trigger signal when a surge pulse occurs, and a surge protection device, coupled to the DC trigger circuit, that generates a clamp voltage and conducts surge currents to ground in response to the trigger signal. A feedback circuit is connected between the surge protection device and the DC trigger circuit. The feedback circuit lowers the clamp voltage so that it does not exceed a failure voltage of the surge protection device.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION

Figure 1:
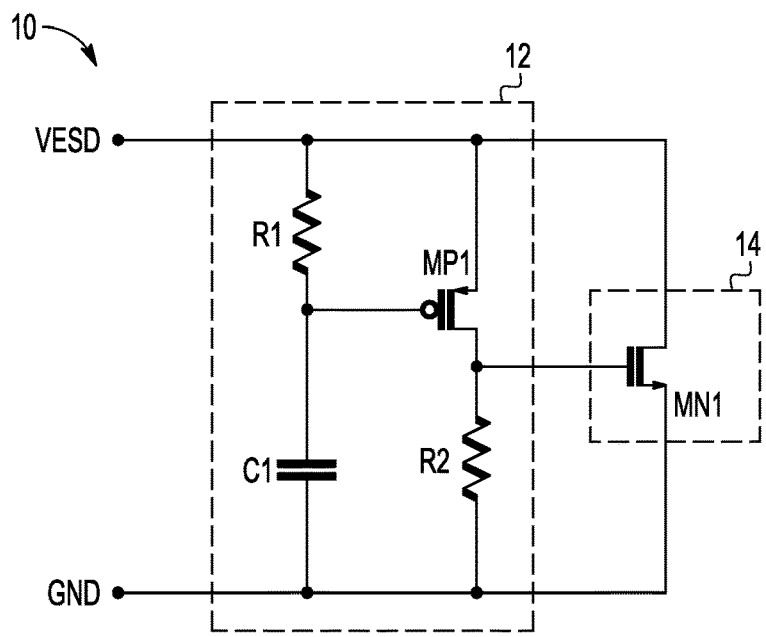
FIG. 1 is a schematic circuit diagram of a conventional ESD protection circuit.
Figure 2:
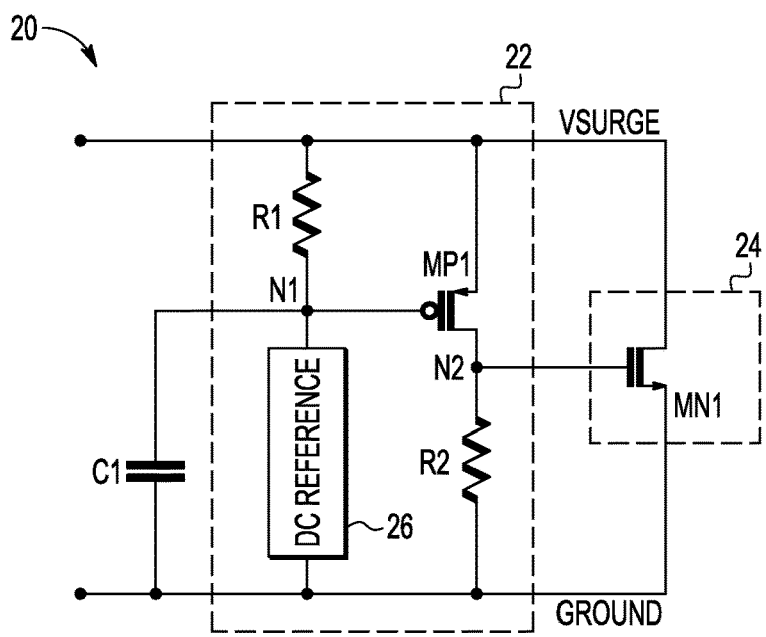
FIG. 2 is a schematic circuit diagram of a surge protection circuit.

FIG. 2 is a schematic circuit diagram of a surge protection circuit 20. The surge protection circuit 20 comprises a DC trigger circuit 22 and a surge protection device 24. The DC trigger circuit 22 includes the first and second resistors R1 and R2, the P-type transistor MP1, and a DC reference 26. The surge protection circuit 20 also includes an AC trigger circuit, like the AC trigger circuit 12 of FIG. 1, which comprises the first and second resistors R1 and R2, the first capacitor C1, and the P-type transistor MP1.

As illustrated in FIG. 2, the first resistor R1 and the first capacitor C1 are connected in series between the node Vsurge and ground. The transistor MP1 and the second resistor R2 are connected in series with each other and in parallel with the first resistor R1 and the first capacitor C1. The DC reference 26 is connected between a first node N1 and ground. The first node N1 is a point between the first resistor R1 and the first capacitor C1, and between the first resistor R1 and the gate of the transistor MP1. The surge protection device 24 comprises the N-type transistor MN1, and has its gate connected to a second node N2, a source connected to ground, and a drain that receives the surge voltage. The second node N2 is located at a point between a drain of the transistor MP1 and the second resistor R2. The DC reference 26 may comprise a variety of elements as long as the elements can show a sudden increase in current at a certain voltage level. For example, the DC voltage detection circuit 26 may include one or more diodes and transistors. The diodes may comprise forward diodes, junction diodes, Zener diodes, etc., and the transistors may comprise NMOS transistors, PMOS transistors, bipolar transistors, extended drain transistors, etc.

The DC reference 26 detects the DC voltage of a surge event, and with the DC trigger circuit 22, generates Vgs for the transistor MP1, such that MN1 is triggered by MP1 and R2. The AC trigger circuit triggers the surge protection device 24 against ESD events. Here, ESD events include HBM (Human Body Model) and IEC (International Electrotechnical Commission) events per IEC standards (i.e., IEC 61000-4). The transistor MP1 amplifies the trigger signals (both AC and DC), which reduces the difference in the surge voltage (Vsurge) clamp level for different surge currents. The transistor MP1 and the second resistor R2 act as an amplification circuit, which is used to trigger the surge protection device 24 to conduct ESD and surge currents to ground and generate a clamp voltage (Vclamp) when an ESD pulse occurs.

Since the surge protection circuit 20 includes both the DC trigger circuit 22 and the AC trigger circuit, the surge protection circuit 20 can provide both surge current protection and ESD protection.

Figure 3:
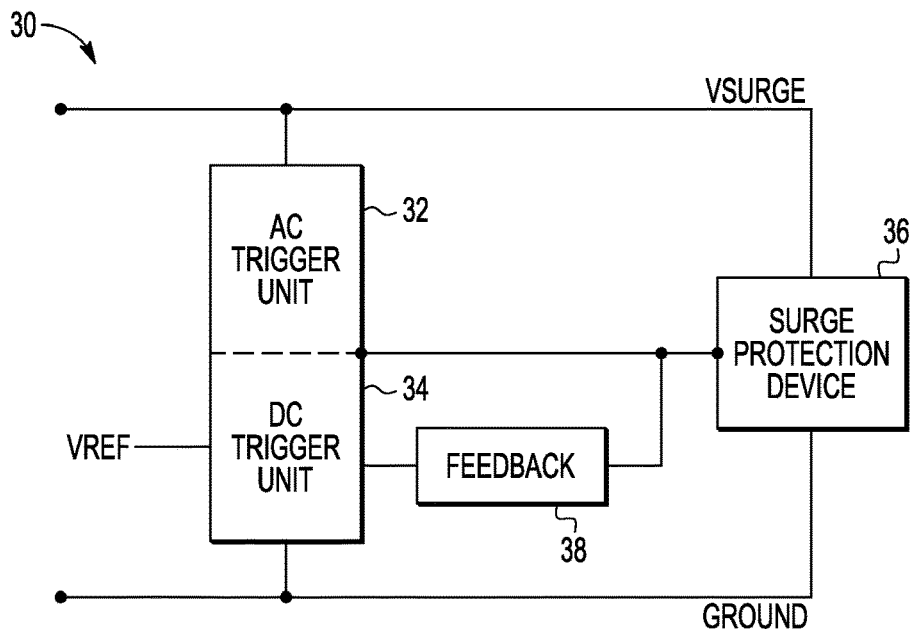
FIG. 3 is a schematic block diagram of an on-chip surge protection circuit in accordance with an embodiment of the present invention.

FIG. 3 is a schematic block diagram of a surge protection circuit 30 in accordance with an embodiment of the present invention. The surge protection circuit 30 includes an AC trigger circuit 32, a DC trigger circuit 34, a surge protection device 36, and a feedback circuit 38 connected between the surge protection device 36 and the DC trigger circuit 34. The DC trigger circuit 34 also is connected to a reference voltage generator and receives a reference voltage (Vref), which will be discussed in more detail with respect to FIG. 5.

The AC and DC trigger circuits 32 and 34 generate a trigger signal when a surge pulse or an ESD event occurs. The surge protection device 36 is coupled to the AC and DC trigger circuits 32 and 34, and generates a clamp voltage and conducts surge currents to ground in response to the trigger signal. The feedback circuit 38 is connected between the surge protection device 36 and the AC and DC trigger circuits 32 and 34. The feedback circuit 38 lowers the clamp voltage so that the clamp voltage does not exceed a failure voltage. In this case, the failure voltage is the breakdown voltage of the N-type transistor MN1. For example, in one embodiment, MN1 has a breakdown voltage of 7.5 v, and the clamp voltage is 6.5 v.

Figure 4:
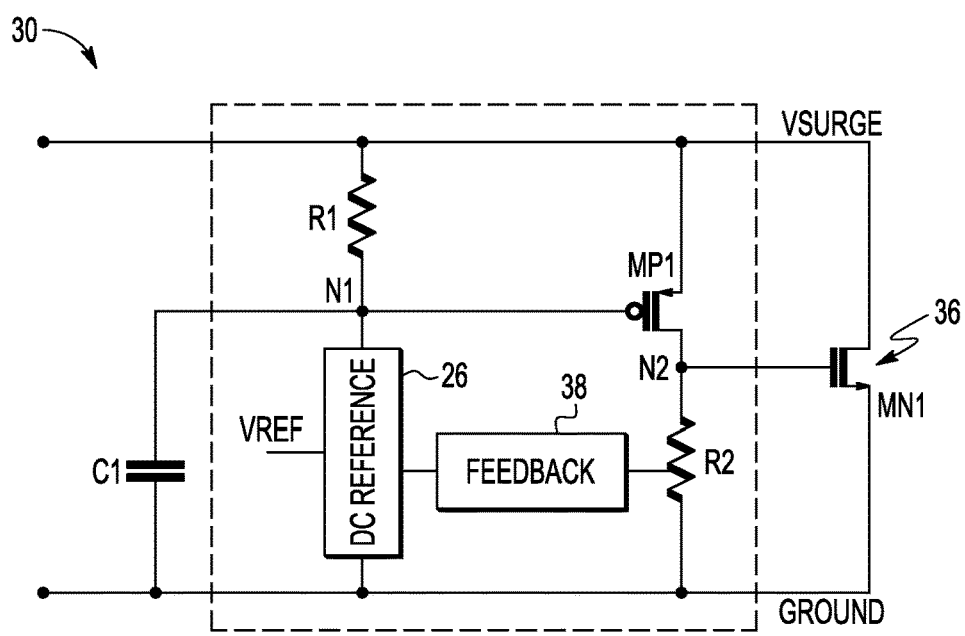
FIG. 4 is a schematic circuit diagram of an embodiment of the surge protection circuit of FIG. 3.

FIG. 4 is a schematic circuit diagram of the surge protection circuit 30 in accordance with a presently preferred embodiment of the present invention. The surge protection circuit 30 comprises the AC trigger circuit 32, the DC trigger circuit 34, the surge protection device 36 and the feedback circuit 38. In this embodiment, the AC trigger circuit 32, like the AC trigger circuit 12 (FIG. 1), comprises the first and second resistors R1 and R2, the first capacitor C1, and the P-type transistor MP1. The DC trigger circuit 34, like the DC trigger circuit 22 (FIG. 2), comprises the first and second resistors R1 and R2, the P-type transistor MP1, and the DC reference 26. As these circuit elements and the manner in which they are connected has been discussed above with reference to FIG. 2, such will not be repeated here.

As discussed with reference to FIG. 3, while the surge protection circuit 30 is similar to the surge protection circuit 20, one difference is that the DC trigger circuit 34 is connected to a voltage reference generator and receives a reference voltage (Vref) therefrom. Connecting the DC trigger circuit 34 to a voltage generator improves the accuracy of the clamp voltage (Vclamp). Reference voltage generator circuits are well known to those of skill in the art so a detailed description and drawing thereof is not required for a complete understanding of the present invention. For example, the reference voltage generator may comprise a pair of bipolar transistors having their bases and collectors connected to ground and their emitters connected to a current mirror, and the reference voltage is provided at a node between a resistor connected to the emitter of one of the bipolar transistors, and the current mirror. The voltage generator also could include a ratio adjustment circuit to set the level of the reference voltage.

The feedback circuit 38 is connected between the second resistor R2 and the DC reference 26, and as previously discussed, the feedback circuit 38 acts to clamp the surge voltage at a lower level.

In operation, after either the AC or DC trigger circuit 32 or 34 is triggered (turned on) by a surge voltage surge voltage (Vsurge), which is a voltage that is above the maximum operating voltage, and the surge protection device 36 clamps the surge voltage to a level below the failure voltage of the surge protection device 36. The feedback circuit 38 further reduces the clamp voltage to improve the voltage head room so that the voltage head room is much lower than the failure voltage.

More specifically, when either the AC or DC trigger circuit 32 or 34 turns on in response to a surge pulse, MP1 is turned on to generate the trigger signal. For example, if the DC voltage detection circuit 34 detects a DC voltage for a surge event, then the detection circuit 34 generates Vgs for MP1, which turns on MP1. The DC voltage detection circuit 34 can be on for the length of a surge pulse. The transistor MP1 and the resistor R1 trigger the surge protection device 36 (MN1) to turn on so that MN1 generates a clamp voltage Vclamp as an output voltage Vout of the surge protection circuit 30 and conducts surge currents to ground. The transistor MN1 is kept ON until the surge event is over.

Figure 5:
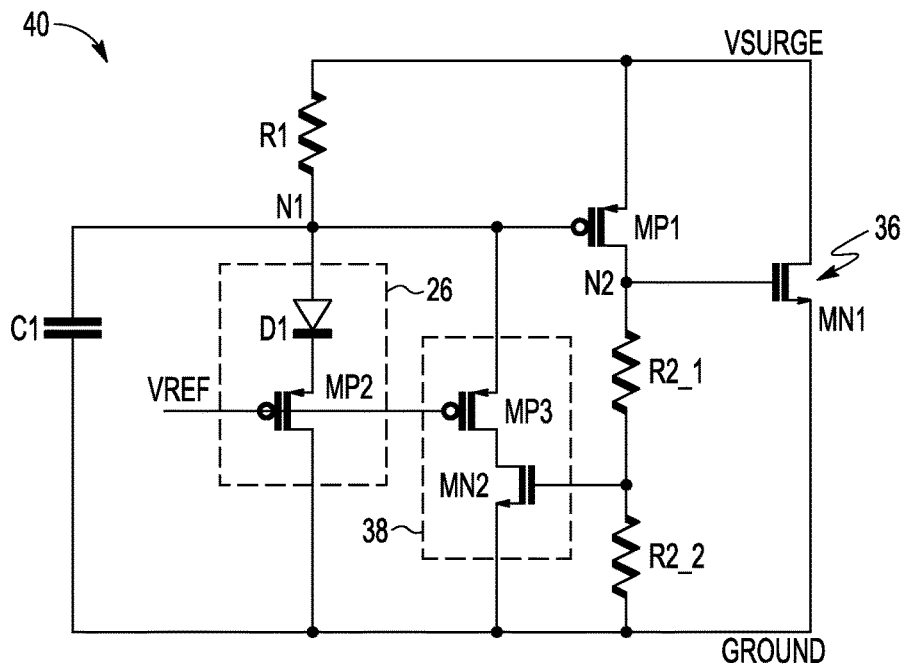
FIG. 5 is a more detailed schematic circuit diagram of the surge protection circuit shown in FIG. 4.

FIG. 5 is a schematic circuit diagram of a voltage surge protection circuit 40 in accordance with another preferred embodiment of the present invention. The surge protection circuit 40 includes an AC trigger circuit, a DC trigger circuit, the surge protection device 36, and the feedback circuit 38. In this embodiment, the AC trigger circuit is similar to the AC trigger circuit 12 shown in FIG. 1, and comprises the first resistor R1, the first capacitor C1, the first P-type transistor MP1, and two second resistors R2_1 and R2_2. The two second resistors R2_1 and R2_2 are connected in series between the drain of the first P-type transistor MP1 and ground. The DC trigger circuit is similar to the DC trigger circuit 22 shown in FIG. 2 and comprises the first resistor R1, the two second resistors R2_1 and R2_2, the P-type transistor MP1, and a DC reference 26.

The DC reference circuit 26 comprises a forward diode D1 having an input connected to the first node N1 and an output connected to a source of a second P-type transistor MP2. The second P-type transistor MP2 has a drain connected to ground and a gate that receives the reference voltage (Vref). The feedback circuit 38 comprises a third P-type transistor MP3 and a second N-type transistor MN2. The third P-type transistor MP3 has a source connected to the first node N1, a gate connected to the gate of the second P-type transistor MP2, and a drain connected to the drain of the second N-type transistor MN2. The second N-type transistor MN2 has a source connected to ground, and a gate connected to a node between the two second resistors R2_1 and R2_2.

In this embodiment, R1, D1, MP1 and MP2 detect the surge voltage. When the surge voltage is higher than a sum of the threshold of MP1, the voltage across D1, the threshold of MP2, and the reference voltage (Vref), the branch R1, D1 and MP1 provides the bias for MP1, which turns MP1 ON, which in-turn turns ON MN1 in order to bypass the surge current and clamp the surge voltage. Meanwhile, MN2 is turned ON, then MP3 is turned ON to lower the clamp voltage.

The advantage of this structure is that, using an accurate reference voltage (Vref), the clamp voltage is more accurate and there is less PVT (process, voltage, temperature) variation. Further, with the feedback circuit 38, the clamp voltage is lower than the failure voltage. For the surge protection circuit 40, the trigger voltage may be calculated as $$V_{trigger} = V\text{ref} + V_{SG\_MP2} + V_{D1} + V_{SG\_MP1} \quad (1)$$

and the clamp voltage during a surge even may be calculated as:

$$V_{clamp} = V\text{ref} + V_{SG\_MP3} + V_{SG\_MP1} \quad (2)$$

Figure 6A:
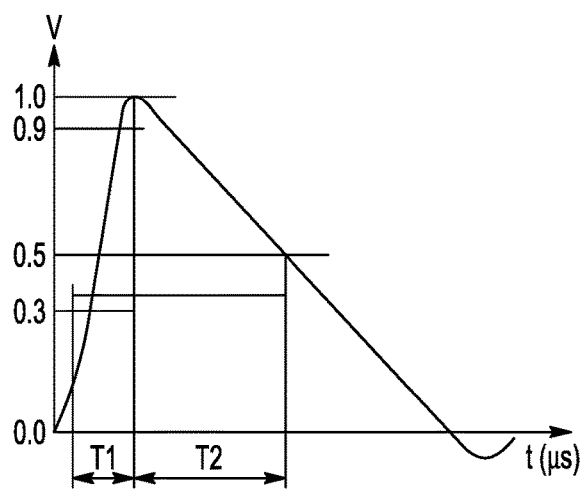
FIGS. 6A and 6B are graphs of Vsurge over time for a standard surge voltage and for the circuit of FIG. 2, respectively.
Figure 6B:
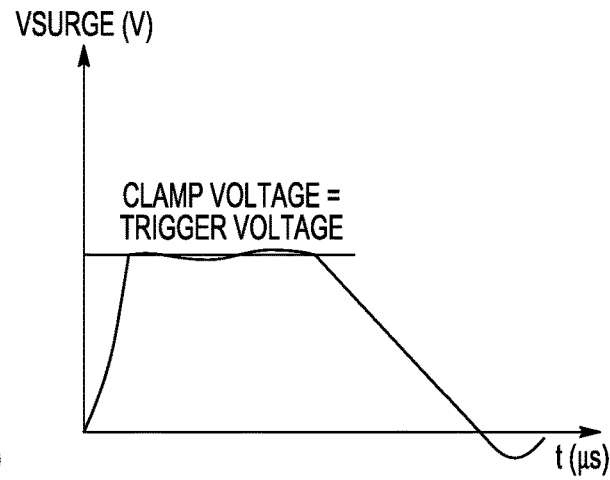

FIGS. 6A and 6B are graphs illustrating an ideal surge pulse (FIG. 6A) in open circuit mode according to IEC61000-4-5, and the clamped surge waveform (FIG. 6B) by the surge protection circuit 20 shown in FIG. 2. As can be seen in FIG. 6A, during time period T1 there is a voltage surge and at the end of time T1, the surge voltage reaches a peak (unit value 1.0). The surge continues until the end of time period T2, at which point the surge voltage drops below a predetermined value, e.g., unit value 0.5. From FIG. 6B, the circuit 20 triggers the surge protection device MN1 when the surge voltage reaches the predetermined trigger voltage (unit value 0.5), where the voltage is clamped for the duration of the surge (T1+T2), and then the voltage drops below the predetermined value. In the circuit 20, the clamp voltage is equal to the trigger voltage.

Figure 7A:
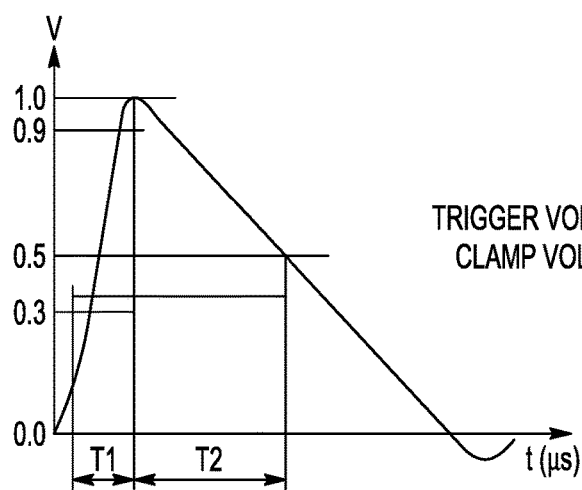
FIGS. 7A and 7B also are graphs Vsurge over time for a standard surge voltage and for the circuit of FIG. 5, respectively.
Figure 7B:
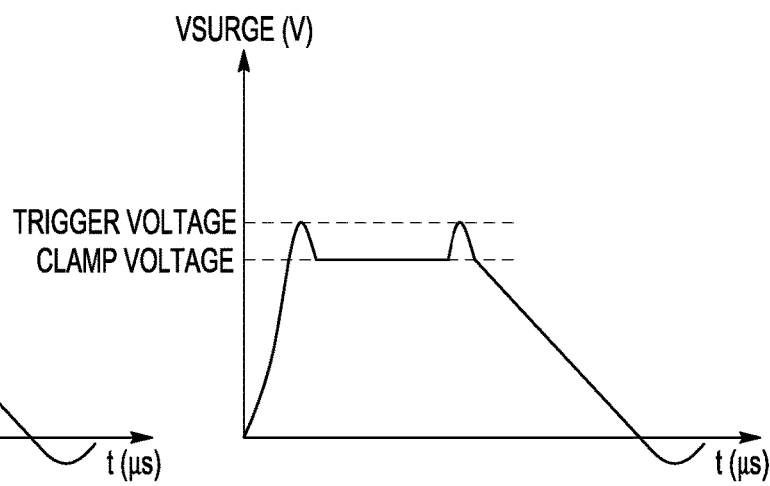

FIGS. 7A and 7B are graphs illustrating an ideal surge pulse (FIG. 7A) in open circuit mode according to IEC61000-4-5, and the clamped surge waveform (FIG. 7B) by the surge protection circuit 40 shown in FIG. 5. The waveform shown in FIG. 7A is the same as that of FIG. 6A, but shown again in order to have a side-to-side comparison with the waveform shown in FIG. 7B.

From FIG. 7B, the circuit 40 triggers the surge protection device MN1 when the surge voltage reaches the predetermined trigger voltage (in this case unit value 0.5). However, rather than clamp the voltage at the trigger voltage, the circuit 40 clamps the voltage at a lower voltage value. The trigger voltage is determined by the reference voltage level (Vref) and the other devices in the DC trigger branch. The clamp voltage is lower than the trigger voltage, and is determined by the feedback circuit 38. The circuit 40 clamps the surge pulse at a safer voltage than the trigger voltage. It is noted that the voltage increases slightly when the surge voltage approaches the trigger voltage. This is because at the end of the surge event, as the surge energy decreases, the current through the transistor MP1 also decreases, and then the voltage cross the second resistor R2_2 decreases until the transistor MN2 goes OFF, then the trigger branch (MP2 and D1) dominates, so the clamp voltage rises to the trigger voltage.

In the above exemplary embodiments, the AC trigger circuit is not limited to having only one amplification stage (MP1, R2), and it may include multiple amplification stages for triggering the surge protection device 36 (MN1). Further, both the DC trigger circuit and the AC trigger circuit may use the same or different amplification circuits.

The N-type transistor MN1 may be a N-type MOS device or a NPN device. It is also possible to use a P-type transistor (such as MOS device or PNP device) as the surge protection device 36. However an implementation with a P-type MOS device as the surge protecting device 36 usually is less desirable due to the lower mobility/higher resistance of the P-type MOS device.

The surge protection circuit of the present invention can handle surges from several tens of volts to more than one hundred volts in mobile application. For high voltage applications, an extended drain NMOST device can be used as the current conducting unit. In addition, the surge protection circuit of the present invention can easily be integrated with Power Management Integrated Circuits (PMICs), connector ICs, load switches and other interface chips. Further, since the surge protection circuit of the present invention includes the AC trigger circuit, it also can handle ESD events.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, the words 'comprising', 'including', and 'having' do not exclude the presence of other elements or steps then those listed in a claim. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A surge protection circuit, comprising:
   a DC trigger circuit connected between a surge voltage node and ground, wherein the DC trigger circuit generates a trigger signal when a surge pulse occurs;
   a surge protection device coupled between the surge voltage node and ground, and coupled to the DC trigger circuit for receiving the trigger signal at a control input, wherein the surge protection device generates a clamp voltage and conducts surge currents to ground in response to the trigger signal; and
   a feedback circuit connected between the control input of the surge protection device and the DC trigger circuit, wherein the feedback circuit lowers the clamp voltage generated by the surge protection device;
   wherein the surge protection device comprises a transistor and the feedback circuit lowers the clamp voltage so that the clamp voltage does not exceed a failure voltage of the transistor.

2. The surge protection circuit of claim 1, wherein the transistor comprises a N-type Metal Oxide Semiconductor (NMOS) transistor (MN1) having a gate connected to the DC trigger circuit for receiving the trigger signal.

3. The surge protection device of claim 1, wherein the DC trigger circuit comprises:
   a first resistor having a first terminal connected to the surge voltage node;
   a DC reference connected between a second terminal of the first resistor and ground;
   a first transistor (MP1) connected between the surge voltage node and ground, and having a gate connected to a first node located between the first resistor and the DC reference; and
   a second resistor connected between the first transistor and ground, wherein the trigger signal is generated at a second node located between the first transistor and the second resistor.

4. The surge protection circuit of claim 3, wherein the DC reference is connected to a reference voltage generator for receiving a reference voltage therefrom.

5. The surge protection circuit of claim 3, wherein the feedback circuit is connected between the second resistor and the DC reference.

6. The surge protection circuit of claim 5, wherein the second resistor comprises a pair of resistors connected in series between the second node and ground, and the feedback circuit comprises:
   a second transistor (MN2) having a gate connected to a node between said pair of resistors; and
   a third transistor (MP3) connected between the second transistor and the first node, and having a gate connected to the DC reference.

7. The surge protection circuit of claim 6, wherein the DC reference is connected to a reference voltage generator for receiving a reference voltage therefrom.

8. The surge protection circuit of claim 7, wherein the DC reference comprises:
a diode having an input connected to the first node; and
a fourth transistor (MP2) connected between an output of the diode and ground, and having a gate connected to a gate of the third transistor and to the reference voltage generator.

9. The surge protection circuit of claim 8, wherein the surge protection device comprises a fifth transistor (MN1) and the feedback circuit lowers the clamp voltage so that the clamp voltage does not exceed a failure voltage of the fifth transistor.

10. The surge protection circuit of claim 9, wherein the fifth transistor comprises a N-type Metal Oxide Semiconductor (NMOS) transistor having a gate connected to the second node for receiving the trigger signal.

11. The surge protection circuit of claim 3, further comprising:
an AC trigger circuit connected to the DC trigger circuit, wherein the AC trigger circuit comprises the first and second resistors, the first transistor, and a capacitor, wherein the capacitor is connected between the first node and ground.

12. The surge protection circuit of claim 11, wherein the DC reference is connected to a reference voltage generator for receiving a reference voltage therefrom.

13. The surge protection circuit of claim 12, wherein the second resistor comprises a pair of resistors connected in series between the second node and ground, and the feedback circuit comprises:
a second transistor (MN2) having a gate connected to a node between said pair of resistors; and
a third transistor (MP3) connected between the second transistor and the first node, and having a gate connected to the DC reference.

14. The surge protection circuit of claim 13, wherein the DC reference comprises:
a diode having an input connected to the first node; and
a fourth transistor (MP2) connected between an output of the diode and ground, and having a gate connected to a gate of the third transistor and to the reference voltage generator.

15. The surge protection circuit of claim 14, wherein the surge protection device comprises a fifth transistor (MN1) and the feedback circuit lowers the clamp voltage so that the clamp voltage does not exceed a failure voltage of the fifth transistor.

16. The surge protection circuit of claim 15, wherein the fifth transistor comprises a N-type Metal Oxide Semiconductor (NMOS) transistor having a gate connected to the second node for receiving the trigger signal.

17. A surge protection circuit, comprising:
a DC trigger circuit connected between a surge voltage node and ground, wherein the DC trigger circuit comprises:
a first resistor having a first terminal connected to the surge voltage node;
a DC reference connected between a second terminal of the first resistor and ground, and further connected to a reference voltage generator for receiving a reference voltage therefrom;
a first transistor (MP1) connected between the surge voltage node and ground, and having a gate connected to a first node located between the first resistor and the DC reference; and
a second resistor connected between the first transistor and ground, wherein DC trigger circuit generates a trigger signal at a second node located between the first transistor and the second resistor when a surge pulse occurs;
an AC trigger circuit connected to the DC trigger circuit, wherein the AC trigger circuit comprises the first and second resistors, the first transistor, and a capacitor, wherein the capacitor is connected between the first node and ground;
a surge protection device comprising a second transistor (MN1) coupled between the surge voltage node and ground, and having a gate coupled to the DC trigger circuit for receiving the trigger signal, wherein the surge protection device generates a clamp voltage and conducts surge currents to ground in response to the trigger signal; and
a feedback circuit connected between the second resistor and the DC reference, wherein the feedback circuit lowers the clamp voltage generated by the surge protection device.

18. The surge protection circuit of claim 17, wherein the second resistor comprises a pair of resistors connected in series between the second node and ground, and the feedback circuit comprises:
a third transistor (MN2) having a gate connected to a node between said pair of resistors; and
a fourth transistor (MP3) connected between the third transistor and the first node, and having a gate connected to the DC reference.

19. The surge protection circuit of claim 18, wherein the DC reference comprises:
a diode having an input connected to the first node; and
a fifth transistor (MP2) connected between an output of the diode and ground, and having a gate connected to a gate of the fourth transistor and to the reference voltage generator.

20. A surge protection circuit, comprising:
a DC trigger circuit connected between a surge voltage node and ground, wherein the DC trigger circuit generates a trigger signal when a surge pulse occurs;
a surge protection device coupled between the surge voltage node and ground, and coupled to the DC trigger circuit for receiving the trigger signal, wherein the surge protection device generates a clamp voltage and conducts surge currents to ground in response to the trigger signal; and
a feedback circuit connected between the surge protection device and the DC trigger circuit, wherein the feedback circuit lowers the clamp voltage generated by the surge protection device;
wherein the DC trigger circuit comprises:
a first resistor having a first terminal connected to the surge voltage node;
a DC reference connected between a second terminal of the first resistor and ground;
a first transistor (MP1) connected between the surge voltage node and ground, and having a gate connected to a first node located between the first resistor and the DC reference; and
a second resistor connected between the first transistor and ground, wherein the trigger signal is generated at a second node located between the first transistor and the second resistor.

* * * * *